(12) United States Patent
Costabel et al.

(10) Patent No.: US 9,816,547 B2
(45) Date of Patent: Nov. 14, 2017

(54) CLIP NUT

(71) Applicant: SFS intec Holding AG, Heerbrugg (CH)

(72) Inventors: Sascha Costabel, Muhlacker (DE); Thomas Klose, Althengstett (DE)

(73) Assignee: SFS intec Holding AG, Heerbrugg (CH)

( * ) Notice: Subject to any disclaimer, the term of this patent is extended or adjusted under 35 U.S.C. 154(b) by 0 days.

(21) Appl. No.: 14/917,474

(22) PCT Filed: Aug. 20, 2014

(86) PCT No.: PCT/EP2014/067706
§ 371 (c)(1),
(2) Date: Mar. 8, 2016

(87) PCT Pub. No.: WO2015/043839
PCT Pub. Date: Apr. 2, 2015

(65) Prior Publication Data
US 2016/0223009 A1    Aug. 4, 2016

(30) Foreign Application Priority Data

Sep. 25, 2013 (DE) .................. 10 2013 016 015
Nov. 28, 2013 (DE) .................. 10 2013 018 113

(51) Int. Cl.
*F16B 37/04* (2006.01)
*F16B 33/00* (2006.01)

(52) U.S. Cl.
CPC .......... *F16B 37/043* (2013.01); *F16B 37/044* (2013.01); *F16B 33/004* (2013.01)

(58) Field of Classification Search
CPC ...... F16B 5/0635; F16B 33/004; F16B 37/04; F16B 37/042; F16B 37/043; F16B 37/044
(Continued)

(56) References Cited

U.S. PATENT DOCUMENTS 2,243,923 A * 6/1941 Swanstrom ............ B21D 39/03
29/438
2,381,233 A * 8/1945 Mills .................... F16B 37/044
403/353
(Continued)

FOREIGN PATENT DOCUMENTS

DE          6908378        2/1969
DE         69620475       11/2002
(Continued)

*Primary Examiner* — Roberta Delisle
(74) *Attorney, Agent, or Firm* — Volpe and Koenig, P.C.

(57) ABSTRACT

A clip nut, including a clip. The clip has a first retaining device, a second retaining device, and a connecting device, which connects the first retaining device to the second retaining device. The distance between the retaining devices is variable. The extension of the first and second retaining devices substantially define an x axis and the extension of the connecting device substantially defines a z axis. A y axis is perpendicular to the x axis and the z axis. The clip nut also includes a nut, which is arranged on the second retaining device such that an axis of the nut is aligned parallel to the z axis and/or perpendicular to the x axis. The axis of the nut is pivotable from the position of the axis of the nut parallel to the z axis and/or perpendicular to the x axis about the axis in an xz plane such that the parallelism of the axis of the nut with respect to the z axis and/or the perpendicular position of the axis of the nut with respect to the x axis is abandoned. A seal facing the first retaining device is provided on the nut, and a component, to which the clip nut is fastened, directly contacts the first retaining device and the seal.

17 Claims, 12 Drawing Sheets

(58) Field of Classification Search
USPC .................................................. 411/172, 174
See application file for complete search history.

(56) References Cited

U.S. PATENT DOCUMENTS

| | | | | |
|---|---|---|---|---|
| 2,815,789 A * | 12/1957 | Hutson | ................. | F16B 37/044 411/111 |
| 3,446,261 A * | 5/1969 | Dey | ................. | F16B 27/00 411/85 |
| 3,478,801 A | 11/1969 | Van Niel | | |
| 4,074,491 A | 2/1978 | Bell et al. | | |
| 4,219,064 A * | 8/1980 | Lozano | ................. | F16B 37/044 411/103 |
| 4,333,211 A | 6/1982 | Gunther | | |
| 5,468,104 A * | 11/1995 | Reid | ................. | F16B 37/044 411/113 |
| 6,474,917 B2 * | 11/2002 | Gauron | ................. | F16B 37/044 411/112 |
| 6,854,941 B2 * | 2/2005 | Csik | ................. | F16B 37/044 411/111 |
| 7,647,744 B2 * | 1/2010 | Payne, Jr. | ................. | E04B 1/82 24/458 |
| 7,896,596 B2 * | 3/2011 | Rausch | ................. | F16B 37/041 411/174 |
| 8,177,466 B2 * | 5/2012 | Csik | ................. | F16B 37/043 411/174 |
| 8,882,537 B2 | 11/2014 | Blanchet et al. | | |

FOREIGN PATENT DOCUMENTS

| | | |
|---|---|---|
| DE | 10207253 | 8/2003 |
| DE | 10241656 | 12/2003 |
| DE | 102004042564 | 3/2006 |
| DE | 102009019205 | 11/2009 |
| DE | 102009024531 | 12/2010 |
| DE | 102011084900 | 4/2013 |
| EP | 1305142 | 5/2003 |
| EP | 1903219 | 3/2008 |
| WO | 9747892 | 12/1997 |
| WO | 0198033 | 12/2001 |

* cited by examiner

CLIP NUT

BACKGROUND

The invention relates to a clip nut comprising a clip which comprises a first retaining device, a second retaining device and a connection device which connects the first retaining device to the second retaining device, the distance between the retaining devices being variable, the extension of the first retaining device and of the second retaining device substantially defining an x-axis and the extension of the connection device substantially defining a z-axis and a y-axis being perpendicular to the x-axis and the z-axis, and comprising a nut arranged on the second retaining device such that an axis of the nut can be oriented in parallel with the z-axis and/or perpendicularly to the x-axis, the axis of the nut being pivotable out of its position parallel to the z-axis and/or perpendicular to the x-axis about the y-axis in an xz-plane, thus giving up its parallelism to the z-axis and/or leaving its position perpendicular to the x-axis.

Clip nuts of this type are used in particular for interconnecting two components, for example metal sheets. To do so, the clip nut is snapped onto one of the sheets such that a screw can be screwed into the thread of the nut, through the hole in the sheet. By means of such a screw, any other components can be attached to the component carrying the clip nut, for example additional metal sheets or contact lugs of cables, e.g. earthing cables.

EP 1 305 142 B1 describes a clip nut. In this case, the component that carries the clip nut is clamped by two holder devices of a resilient clip, whilst the nut is arranged on a retaining element, i.e. on the side of the retaining element facing away from the component.

DE 10 2011 084 900 A1 describes a clip nut that is used to fasten a contact lug to a component. In this case too, two retaining elements are provided which directly contact the component, whilst the nut is arranged on the outside of one of the retaining elements, without contacting the component.

The drawback of these arrangements from the prior art is that problems arise when components of different thicknesses are intended to be equipped with the same clip nut. This problem is outlined in FIGS. 16 and 17. In FIG. 16, the clip nut 110 is snapped onto a relatively thin component 132 and so the retaining devices 114, 116 rest on the component 132 effectively. In particular, the lower retaining element 116 abuts the component 132 in the region where the nut 128 is arranged on the side of the retaining device 116 facing away from the component 132. A screw screwed into the nut 128 can thus pass through the nut 128, the component 132 and the retaining device 114, 116 in the region of the openings provided for this purpose. FIG. 17 shows a different situation. In this figure, a relatively thick component 132' is inserted into the clip 110. It can be seen that the outer region of the retaining device 116 does not come into contact with the component as it should, and also that the axis of the nut 128 is different from an axis defined by an opening in the component 132'. In this respect, the clip nuts 110 from the prior art shown in FIGS. 16 and 17 are only suitable for relatively thin metal sheets, such as the sheet 132 according to FIG. 16.

U.S. Pat. No. 4,074,491 describes a clip, the inner surface of which is provided with an elastomer. By means of this elastomer, the clip contacts a component on which the clip is mounted.

DE 102 41 656 A1 and EP 1 305 142 B1 each describe retaining clips, the two arms of which contact the component on which the clip is mounted.

DE 10 2009 024 531 A1 discloses a clip nut, the nut of which is fastened to a first arm of a clip and in the process protrudes through the component on which the clip is mounted. At the same time, the nut contacts the opposite, second arm of the clip. The component is contacted by the arms of the clip.

DE 10 2004 042 564 A1 relates to a U-shaped clamping piece for attaching to a plate provided with an opening, comprising two planar legs connected by means of a bracket, and a nut part for being received in an opening. The nut directly contacts a component on which the clamping piece is mounted.

U.S. Pat. No. 4,333,211 discloses a resilient clip having an integrated conical receptacle for an end of a bolt.

DE 69 08 378 U describes a fastening device comprising resilient legs for mounting onto a bar or a plate. Also provided is a receptacle for an insert which comprises a threaded-engagement opening and produces a firmly clamped connection to the bar or plate when a threaded screw is screwed in.

SUMMARY

The problem addressed by the invention is that of remedying the above-described drawbacks of the prior art and in particular of providing a clip nut that can be easily snapped onto components of different thicknesses, in order to then allow a screw to be screwed in, as is intended.

This problem is solved by the features of the independent claim; advantageous embodiments of the invention are set out in the dependent claims.

The invention builds on the generic clip nut in that a seal facing the first retaining device is provided on the nut and in that a component on which the clip nut is fastened is in direct contact with the first retaining device and the seal. The pivotability of the nut about the y-axis allows it to be oriented such that a screw screwed into the nut encounters a hole to be penetrated by the screw and penetrates this hole easily. The problems of the prior art, which are produced by the axis of the nut and that of the through-hole in the component not being in line with each other (cf. FIG. 14), are thus overcome. By means of the seal provided on the nut, the regions or spaces defined by the various sides of the component can be sealed from one another so that no liquids or gases can escape from one region into another. An elastically or plastically deformable seal is also capable of compensating for component tolerances. The seal can be produced by an O-ring pressed on the nut casing. Likewise, for example circular or rectangular elastomer components that have been sprayed, glued or vulcanised on can also be provided as the seal. Owing to the pivotable nut being in contact with the bottom part, there is no need to design the second retaining device to be pivotable in order to make the nut pivotable. Instead, as in the prior art, the second retaining device can simply be movable relative to the first retaining device as a result of the resilient properties of the clip, whilst the pivoting about the y-axis only applies to the nut itself.

According to a preferred embodiment, the second retaining device comprises two planar retaining arms extending in the xz-plane, the nut being held between the retaining arms by said arms. Since the retaining arms extend in the xz-plane, the nut can only rotate or pivot about the y-axis, i.e. in the desired manner.

This can be produced by the retaining arms comprising openings or recesses in which protrusions of the nut are supported. Alternatively, the nut can be supported in the clip by means of balls or via pins.

According to another embodiment of the invention, said invention is developed in that the second retaining device comprises a retaining arm which provides a sliding guide for the nut. As a result, the clip nut can have an overall narrow design since no side protrusions have to be provided on the nut.

It is particularly expedient for the pivotability of the nut to be limited in at least one direction. Since the nut is prevented from rotating excessively in the clip, there is no need to first bring the nut into position before the clip nut is assembled. Limiting the rotation thus allows the clip nut to be joined to the metal sheet in an ergonomic and functionally reliable manner.

In particular, the pivotability of the nut can be limited by a protruding rim of the nut that faces the first retaining device and abuts the second retaining device when the nut is pivoted to a maximum.

It may also be expedient for the pivotability of the nut to be limited by a peg that is attached to the nut and abuts the second retaining device when pivoted to a maximum.

In the context of the embodiment that provides a sliding guide, the pivotability of the nut can be expediently limited by a peg that is attached to the retaining device and abuts a limit stop of a slot in an outer contour of the nut when pivoted to a maximum.

It is advantageous for the nut to comprise an insertion aid that faces the first retaining device and extends in the axial direction. This insertion aid can, for example, be in the form of a dome on the nut body, by means of which dome the component slides into the clip nut during insertion.

According to the preferred embodiments, the nut comprises a threaded insert or a taper nut.

It is also possible for a component of a quarter-turn catch, a bayonet catch or a snap-in connection to be provided instead of a nut.

According to another embodiment, the clip nut is designed such that a component having a hole for inserting a pin is provided instead of a nut. In this case, it is expedient for the pin to have an exact fit in the hole.

In another particularly preferred embodiment of the invention, the clip consists of at least a first and a second clip element, the clip elements being interconnectable and separable. On this basis, there are no restrictions on the material properties of the various portions of the clip, and so the various portions of the clip can be optimised in view of their different tasks.

In this context, it is particularly advantageous for a first clip element to consist of sheet metal and for a second clip element to consist of plastics material.

It is particularly advantageous for the first clip element to comprise the first retaining device and for the second clip element to comprise the second retaining device. Lastly, the first retaining device can thus be designed as a type of leaf spring, as a result of which it is in principle possible to apply a higher clamping force than with resilient plastics parts. For the second retaining device, however, plastics material is a completely suitable material. Plastics material can be machined to an exact geometry, which is necessary for the nut to be received exactly in the clip. Likewise, plastics material has good mobility for receiving the nut in the clip when said nut is inserted. In addition to the increased clamping force by comparison with a first retaining device made of plastics material, selecting sheet metal as the material for the first retaining device also widens the value range for the different sheet thicknesses for which the clip nut is suitable. A high clamping force is applied to thin sheets, and, owing to the improved mobility, it is possible at the same time to use relatively thick sheets in combination with the same clip nut.

Furthermore, the first clip element can comprise two elastically deformable snap-in noses and the second clip element can comprise two openings for receiving the snap-in noses. As a result, a reliable connection between the clip elements is provided in order to form the clip as a whole.

In this context, the second clip element can comprise two grooves as insertion aids for the snap-in noses. Owing to the presence of recesses, a lower degree of resilience is sufficient for the snap-in noses.

BRIEF DESCRIPTION OF THE DRAWINGS

The invention will now be explained on the basis of particularly preferred embodiments, with reference to the accompanying drawings, in which.

In the description of the drawings, like reference numerals denote like or similar components.

DETAILED DESCRIPTION OF THE PREFERRED EMBODIMENTS

Figure 1:
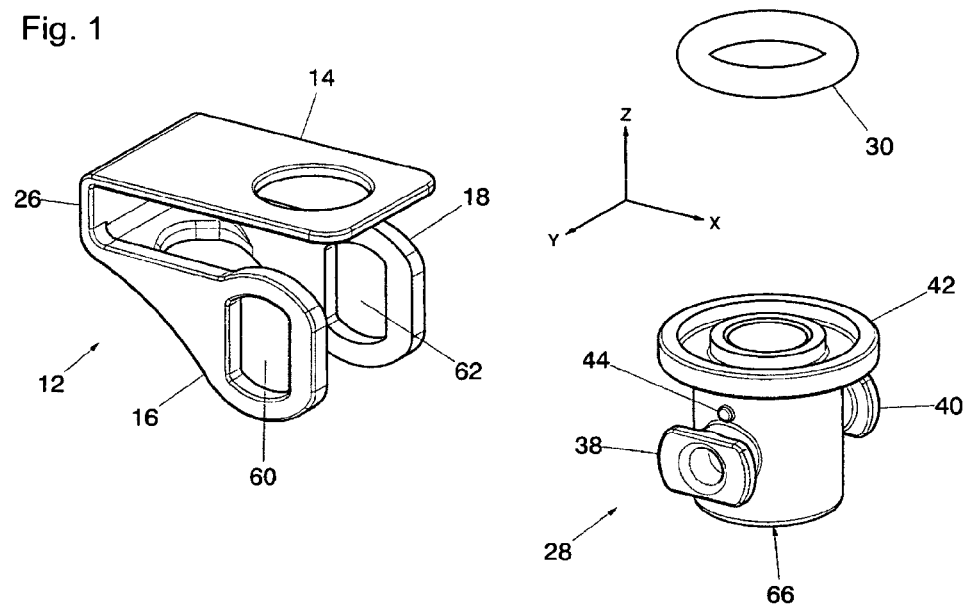
FIG. 1 is a perspective exploded view of both a clip nut according to the invention and a component.
Figure 2:
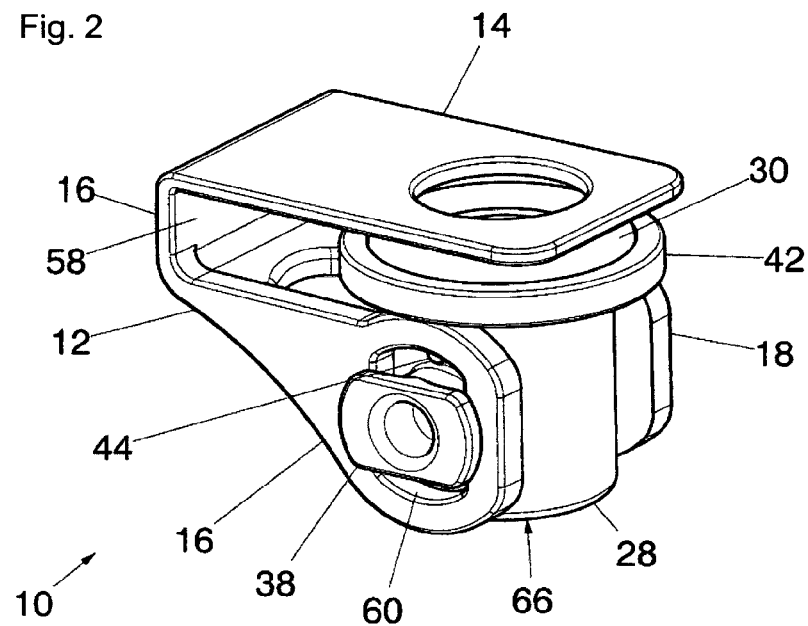
FIG. 2 is a perspective view of a clip nut according to the invention.
Figure 3:
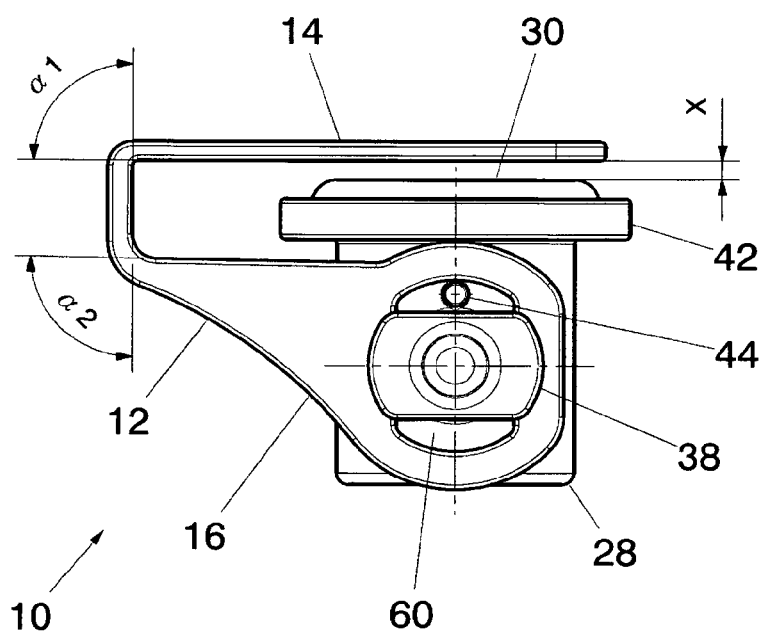
FIG. 3 is a side view of a clip nut according to the invention.

FIG. 1 is a perspective exploded view of both a clip nut 10 according to the invention and a component. FIG. 2 is a perspective view of a clip nut 10 according to the invention. FIG. 3 is a side view of a clip nut 10 according to the invention. The coordinate system in FIG. 1 is used to illustrate the coordinates stated above and in the claims. The clip nut 10 comprises a clip 12, which is preferably made of a viscoplastic plastics material. The resilience required when snapping on components of different thicknesses is thereby ensured. The component parts of the clip 12 are a first retaining device 14 and a second retaining device 16, 18, which in this embodiment comprises two planar retaining arms 16, 18 having openings 60, 62 provided therein. The first retaining device 14 and the second retaining device 16, 18 are interconnected by a connection device 26. The first retaining device 14 is planar. The nut 28 preferably consists of a high-strength plastics material in order to absorb the forces that are produced when a screw is tightened. The nut 28 can also be made of metal. The nut 28 has two opposite side protrusions 38, 40 and a protruding rim 42. A seal 30 is also provided. The seal 30 seals the regions on the various sides of the component from one another. The bottom 66 of the nut is closed for this purpose. A planar, in particular sheet-like, component having an opening that is provided for guiding through a screw to be screwed into the nut 28 is guided between the first retaining device 14 and the retaining arms 16, 18. In the process, the clip 12 adapts to the sheet by the angles α1 and α2 changing. The clip is designed such that it retains its position on the metal sheet by means of a slight preloading force. The clamping force is generated by the resistance that is produced when the clip is elastically deformed. The sheet has preferably reached its target position in relation to the clip nut when it abuts the stop surface 58. In this state, the opening in the sheet is then aligned with the axis of the nut 28. In addition, the nut comprises a peg 44 that is attached to the side thereof and is used to limit the pivoting of the nut 28 relative to the clip. This will be explained in more detail below in connection with FIGS. 7 and 8. It should also be mentioned that the first retaining device 14 can be designed differently. In particular, it does not have to be planar in order to comprise a hole through which a screw can pass. Instead, it is also conceivable for the retaining device to be formed as a side finger, so that the region around a hole in a plate inserted into the clip nut is left free. In an embodiment of this type, for example a contact lug for earthing the metal sheet can be directly screwed to the metal sheet.

Figure 4:
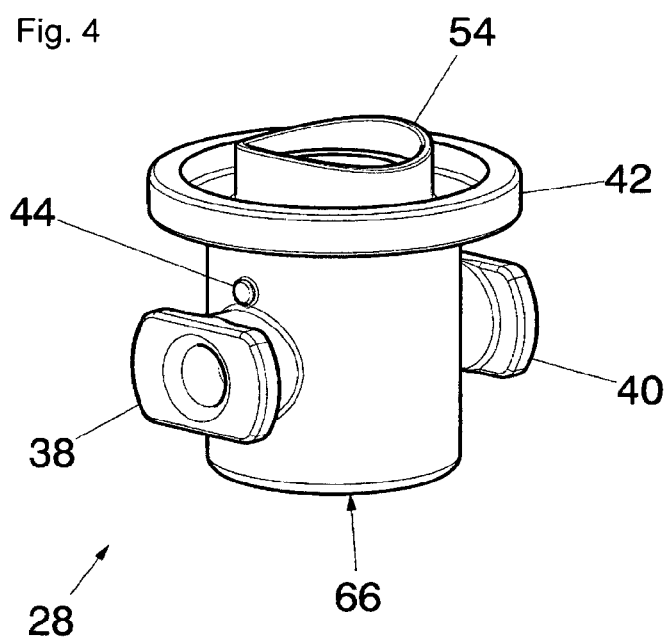
FIG. 4 is a perspective view of a nut.

FIG. 4 is a perspective view of a nut. The nut 28 having its side protrusions 38, 40 and its rim 42 can also be designed to have an insertion aid 54 extending in the axial direction. During the insertion process, said aid contacts the component to be inserted and also defines the relative position of the clip nut and the component by penetrating the opening in an inserted component provided a screw has not yet been screwed into the nut from above.

Figure 5:
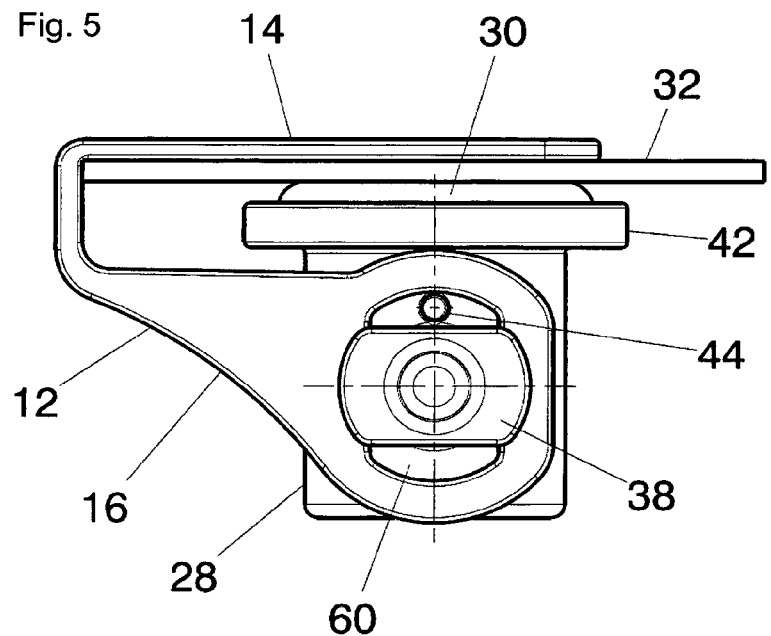
FIG. 5 is a side view of a clip nut according to the invention having a thin component inserted therein.
Figure 6:
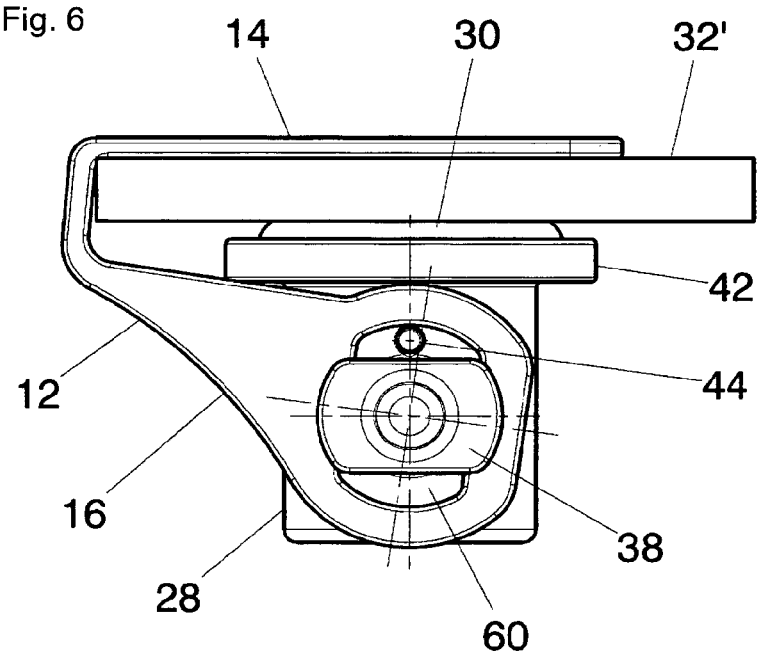
FIG. 6 is a side view according to the invention of a clip nut according to the invention having a thick component inserted therein.

FIG. 5 is a side view of a clip nut according to the invention having a thin component inserted therein. FIG. 6 is a side view according to the invention of a clip nut according to the invention having a thick component inserted therein. Regardless of whether a thin sheet 32 or a thick sheet 32' is pushed between the first retaining device 14 and the second retaining device 16, 18, the bearing surfaces on either side of the sheet 32, 32' are in alignment with the top surfaces of said sheet. This is achieved in that, when a thick sheet 32' is inserted, the second retaining device 16, 18, i.e. the retaining arms 16, 18, are bent downwards relative to the first retaining device 14, while the nut 28 performs a compensating pivot in order to maintain or produce the parallelism of the bearing surfaces.

Figure 7:
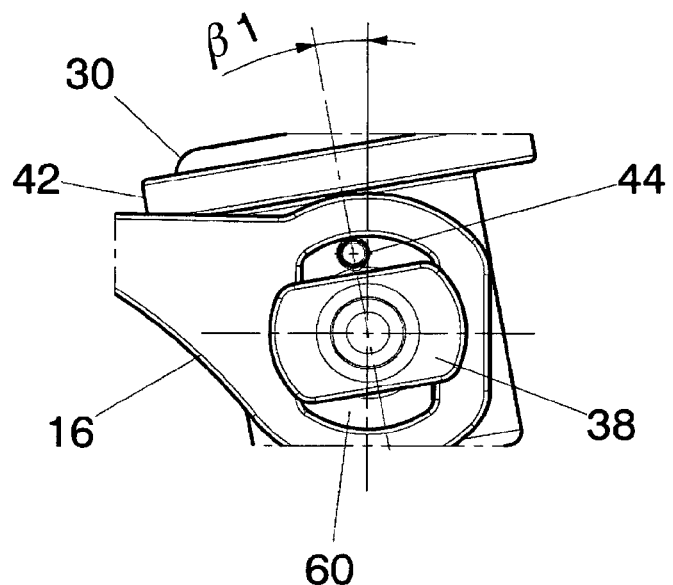
FIG. 7 is a view of a detail of a clip nut according to the invention, with the nut pivoted to a maximum towards the left.
Figure 8:
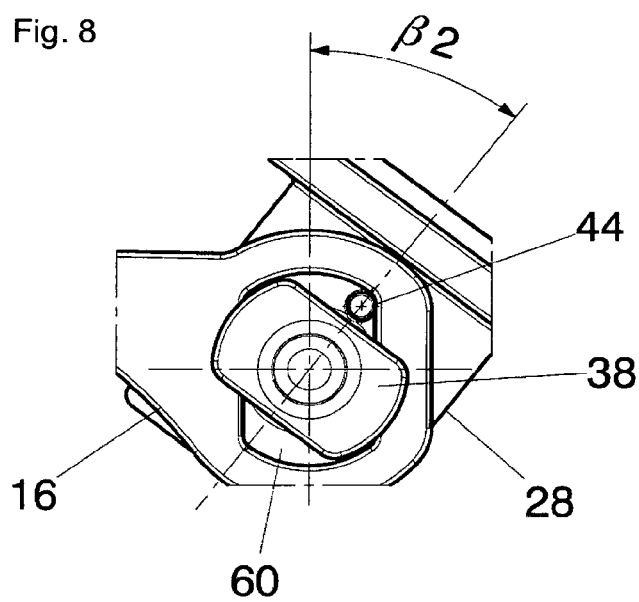
FIG. 8 is a view of a detail of a clip nut according to the invention, with the nut pivoted to a maximum towards the right.

FIG. 7 is a view of a detail of a clip nut according to the invention, with a nut pivoted to a maximum towards the left. FIG. 8 is a view of a detail of a clip nut according to the invention, with a nut pivoted to a maximum towards the right. The pivot of the nut 28 relative to the clip 14 is limited in one direction by the angle β1. In this case, the rim 42 of the nut is form-locked with the second retaining device 16, 18. In the other direction, the pivot is limited by the angle β2 by the peg arranged on the nut 28, when the peg strikes the edges of the opening 60. The rotation may also be prevented to some extent by the edge 42 of the nut striking the first retaining device 14 when pivoted according to FIG. 8. This limiting, however, is not inevitable since the distance between the first retaining device 14 and the second retaining device 16, 18 can be changed as a result of the elastic deformability of the clip 12.

Figure 9:
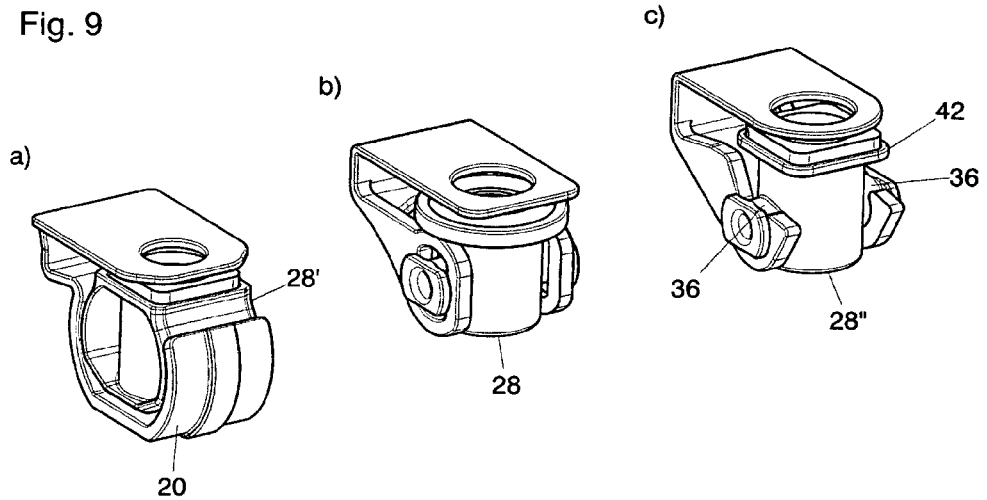
FIG. 9 shows various embodiments of clip nuts according to the invention.

FIG. 9 shows various embodiments of clip nuts according to the invention. FIG. 9a shows a clip nut having a second retaining device 20, which consists of just one retaining arm 20. This retaining arm 20 provides a sliding guide for the nut 28', so the pivotability is also ensured in this case. FIG. 9b shows the embodiment already explained in connection with FIGS. 1 to 8. FIG. 9c shows an embodiment that is very similar to that in FIG. 9b. However, the planar retaining arms are not provided with openings but rather only with recesses 36, and so the nut 28" could easily be removed upwards. Likewise, the protruding rim 42 of the nut 28" is angular. Each of the nuts 28, 28', 28", shown in FIG. 9 can optionally be formed with a round or angular rim.

Figure 10A:
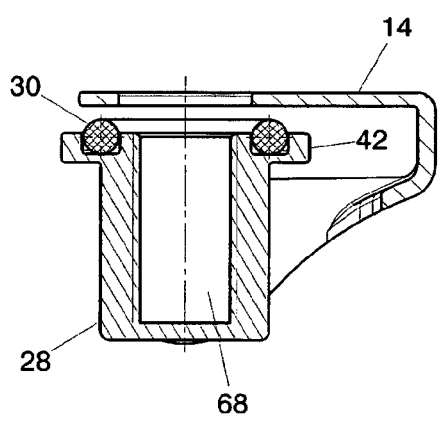
FIGS. 10A and 10B shows two views of a clip nut according to the invention.
Figure 10B:
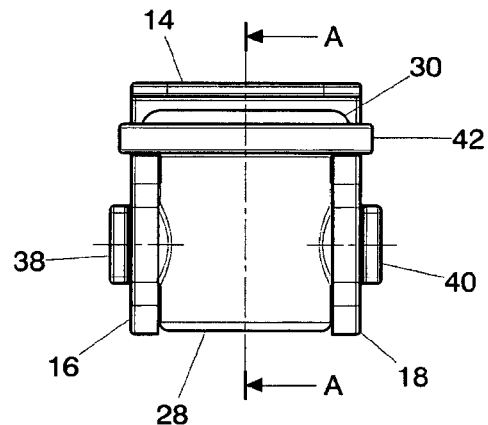

FIGS. 10A and 10B shows two views of a clip nut according to the invention. The clip nut is the same as that shown in FIG. 9b. The right-hand view shows the clip nut from the front, i.e. the view is directed at the open end of the clip nut. The line AA in FIG. 10B defines the section that can be seen in FIG. 10A. In the section, it can be seen that the threaded hole 68 is aligned with the opening in the first retaining device 14.

Figure 11A:
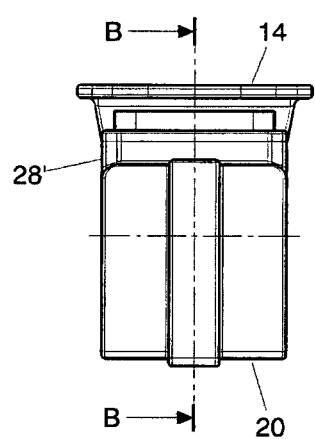
FIGS. 11A and 11B shows two views of a clip nut according to the invention.
Figure 11B:
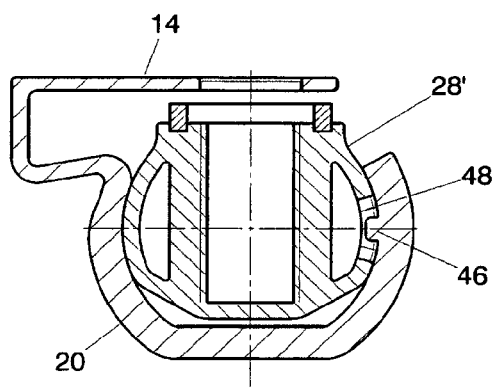

FIGS. 11A and 11B shows two views of a clip nut according to the invention. The clip nut is the same as that shown in FIG. 9a. The line BB in FIG. 11B denotes the section that can be seen in FIG. 11A. The nut 28' is guided through the retaining arm 20 having the sliding guide. By means of a slot 48 in the nut 28' and a peg 46 on the inside of the retaining arm 20, which peg limits the pivot of the nut 28' when it strikes the ends of the slot 48, the pivot is limited and a captive-locking means is produced.

Figure 12:
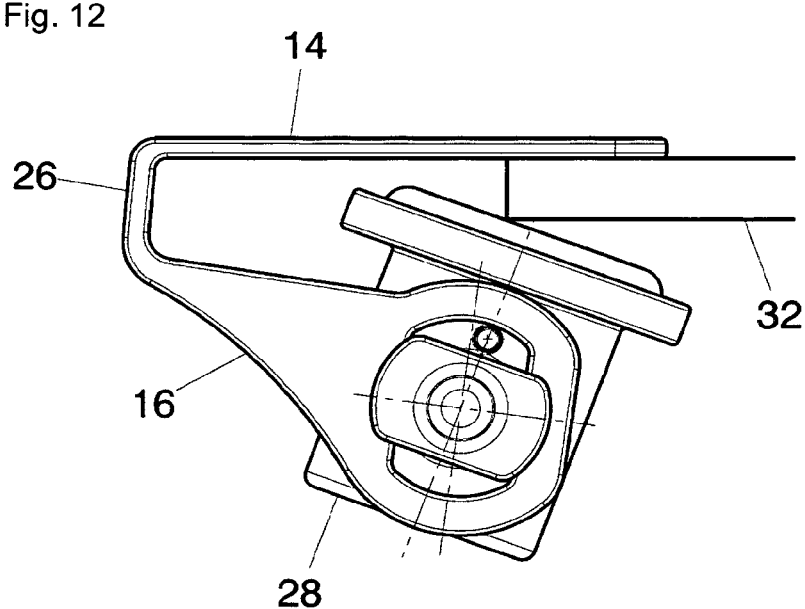
FIG. 12 shows a clip nut according to the invention in a state in which a component has just been inserted.

FIG. 12 shows a clip nut according to the invention in a state in which a component has just been inserted. It can be seen here that when the sheet 32 is inserted into the clip nut 10, the nut 28 first rotates outwards, i.e. towards the open ends of the retaining devices 14, 16, 18. The sheet 32 is inserted and then contacts the nut 28 and/or the seal or the insertion aid (not shown) and the first retaining device 14. As the sheet 32 is slid in further, the nut 28 rotates until the bearing surface, i.e. the contact surface of the first retaining device 14, the two surfaces of the sheet 32 and the contact surface of the nut 28 are parallel. The sheet can then be slid in as far as to the stop on the inside of the connection device 26. An opening in the sheet and the axis of the nut 28 should then be in alignment.

Figure 13:
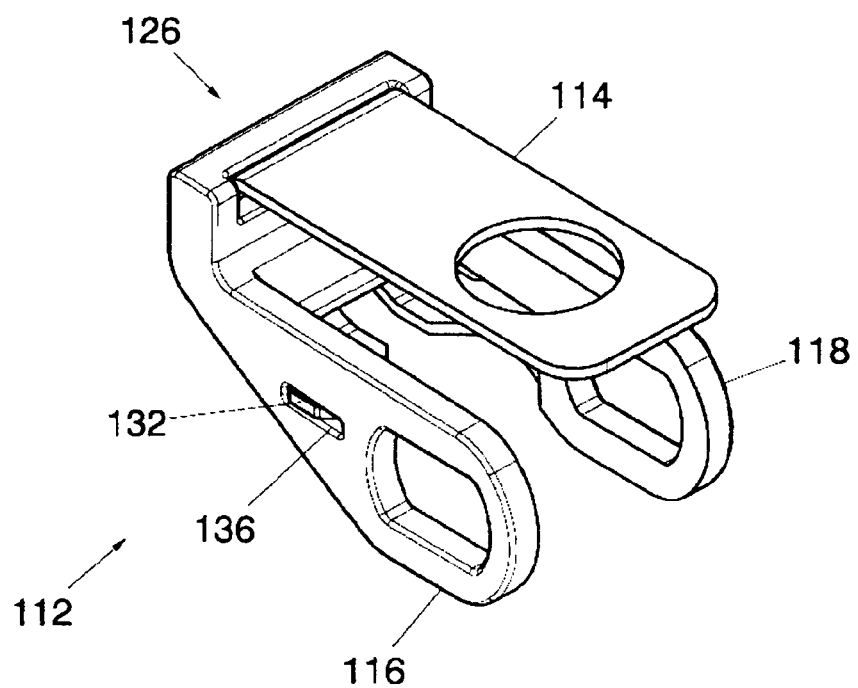
FIG. 13 is a perspective view of an additional embodiment of a clip for a clip nut according to the invention.
Figure 14:
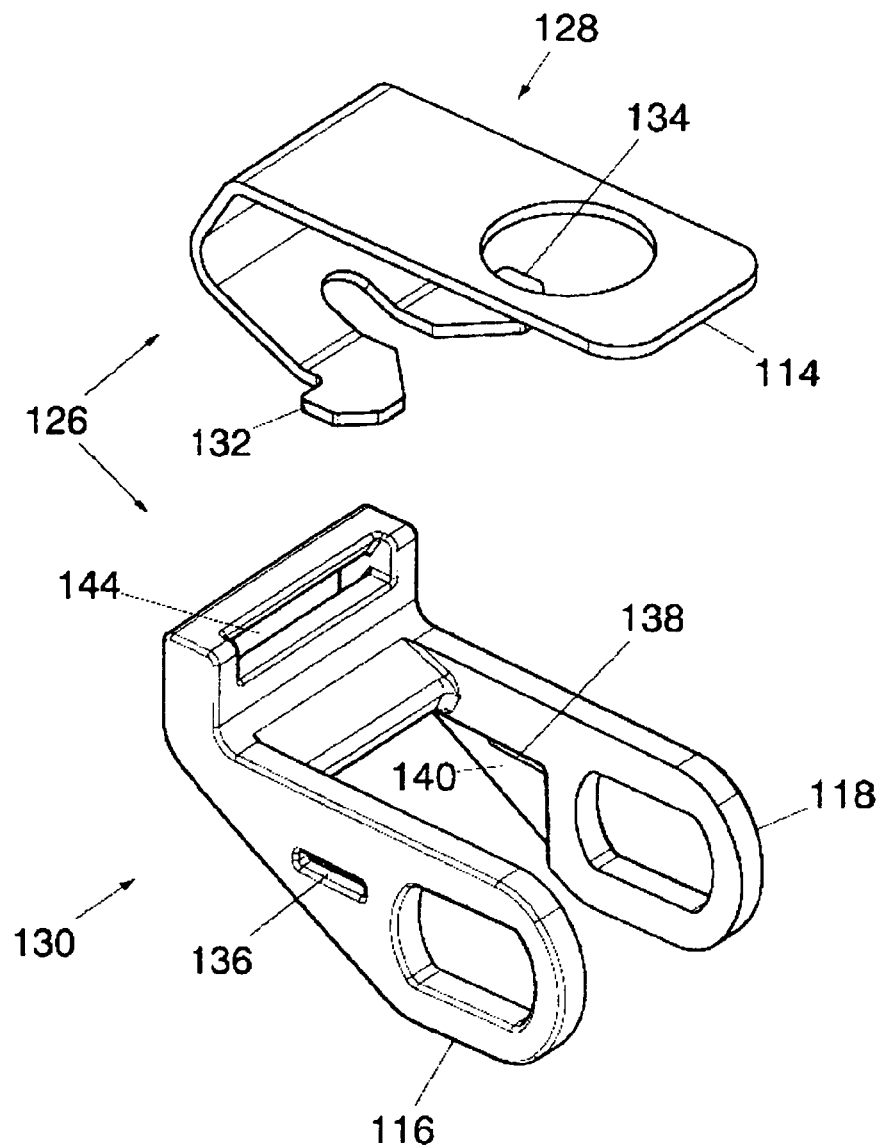
FIG. 14 is a perspective view of the clip elements of the clip according to FIG. 13.
Figure 15:
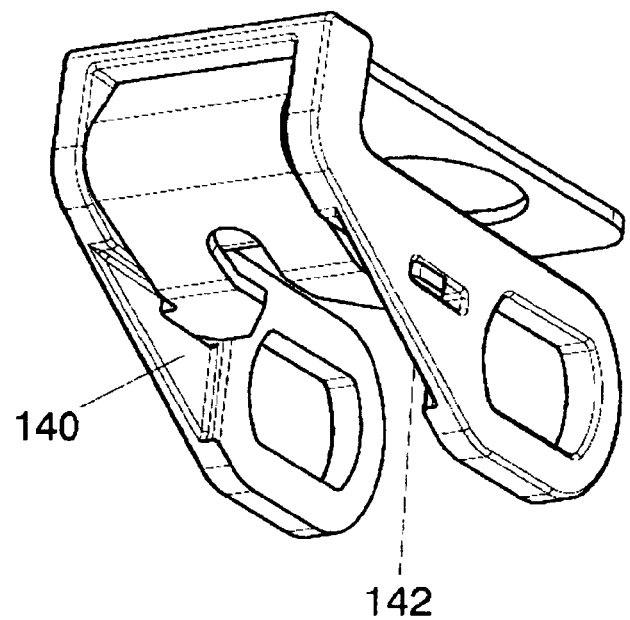
FIG. 15 is a perspective view of the clip according to FIG. 13.
Figure 16:
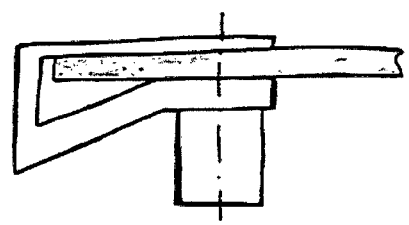
FIG. 16 is an outline of the prior art.
Figure 17:
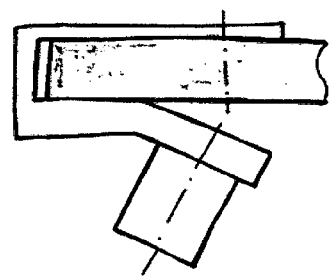
FIG. 17 is an additional outline of the prior art.

FIG. 13 is a perspective view of another embodiment of a clip 112 for a clip nut according to the invention. FIG. 14 is a perspective view of the clip elements 128, 130 of the clip 112 according to FIG. 13. FIG. 15 is another perspective view of the clip 112 according to FIG. 13. The clip 112 consists of a first clip element 128 and a second clip element 130. The first clip element 128 comprises the first retaining device 114. Said element consists of sheet metal and is formed as a punched part. The second clip element 130 is made of plastics material and comprises the retaining arms 116, 118 of the second retaining device. The second clip element 130 is equipped with openings 136, 138. These openings are used to receive snap-in noses 132, 134 of the first clip element 128. As insertion aids for the snap-in noses 132, 134, the second clip element 130 is equipped with recesses 140, 142. The first clip element 128 can thus be simply and securely connected to the second clip element 130 by the first retaining device 114 being simply pushed through the slit 144 until the snap-in noses 132, 134 reach the region of the recesses 140, 142. The snap-in noses 132, 134 now have to be slightly elastically deformed inwards. Then, the first clip element 128 can also be guided further together with the second clip element 130 until the snap-in noses 132, 134 finally latch into the recesses 136, 138, where they securely hold the clip elements 128, 130 together. In the present case, the connection device 126 of the clip elements 128, 130 is produced by the aforementioned components of the two clip elements interacting.

In all embodiments of the invention, there is no need for the connection element to extend perpendicularly to the x-axis. Ultimately, it is merely important that the retaining devices are at a distance from one another and the axis of the nut can be perpendicular to a plane defined by the first retaining device, i.e. perpendicular to the xy-plane.

The features of the invention disclosed in the above description, the drawings and in the claims can be essential to the implementation of the invention both individually and in any combination.

LIST OF REFERENCE NUMERALS 10 clip nut
12 clip
14 first retaining device
16 second retaining device, retaining arm
18 second retaining device, retaining arm
20 second retaining device, retaining arm
22 second retaining device, retaining arm
24 second retaining device, retaining arm
26 connection device
28 nut
28' nut
28" nut
30 seal
32 metal sheet
32' metal sheet
34 openings
38 protrusion
40 protrusion
42 rim
44 peg
46 peg
48 slot
54 insertion aid
58 stop surface
60 opening
62 opening
66 bottom
112 clip
114 first retaining device
116 second retaining device, retaining arm
118 second retaining device, retaining arm
126 connection device
128 first clip element
130 second clip element
132 snap-in nose
134 snap-in nose
136 opening
138 opening
140 recess
142 recess
144 slit

The invention claimed is:

1. A clip nut (10) comprising:
a clip (12, 112) which comprises a first retaining device (14, 114), a second retaining device (16, 18, 20, 22, 24, 116, 118) and a connection device (26, 126) which connects the first retaining device (14, 114) to the second retaining device (16, 18, 20, 22, 24, 116, 118), a distance between the retaining devices (14, 16, 18, 20, 22, 24, 114, 116, 118) being variable,
an extension of the first retaining device (14, 114) and of the second retaining device (16, 18, 20, 22, 24, 116, 118) substantially defining an x-axis and an extension of the connection device (26, 126) substantially defining a z-axis, and a y-axis being perpendicular to the x-axis and the z-axis, and
a nut (28) pivotally arranged on the second retaining device (16, 18, 20, 22, 24, 116, 118) such that an axis of the nut (28, 28') is oriented in parallel with the z-axis or perpendicularly to the x-axis, or both,
the axis of the nut (28, 28') being pivotable out of a position parallel to the z-axis or a position perpendicular to the x-axis, or both, about the y-axis in an xz-plane, at least one of moving from the position parallel to the z-axis or moving from the position perpendicular to the x-axis;
a seal (30) facing the first retaining device (14, 114) is provided on the nut (28), and a component (32) on which the clip nut (10) is fastened is in direct contact with the first retaining device (14, 114) and the seal (30).

2. The nut (10) according to claim 1, wherein the second retaining device (16, 18, 20, 22, 24, 116, 118) comprises two planar retaining arms (16, 18, 20, 22, 24, 116, 118) extending in the xz-plane, the nut (28, 28') being held between the retaining arms (16, 18, 20, 22, 24, 116, 118) by said arms.

3. The clip nut (10) according to claim 2, wherein the retaining arms (16, 18, 20, 22, 24, 116, 118) comprise openings (34) or recesses (36) in which protrusions (38, 40) on the nut (28, 28') are supported.

4. The clip nut (10) according to claim 1, wherein the second retaining device (20) comprises a retaining arm (20), which provides a sliding guide for the nut.

5. The clip nut (10) according to claim 1, wherein the pivotability of the nut (28, 28') is limited in at least one direction.

6. The clip nut (10) according to claim 5, wherein the pivotability of the nut (28, 28') is limited by a protruding rim (42) of the nut (28) that faces the first retaining device (14, 114) and abuts the second retaining device (16, 18, 20, 22, 24, 116, 118) when the nut is pivoted to a maximum.

7. The clip nut (10) according to claim 5, wherein the pivotability of the nut (28) is limited by a peg (44) that is attached to the nut (28) and abuts the second retaining device (16, 18, 20, 22, 24, 116, 118) when pivoted to a maximum.

8. The clip nut (10) according to claim 5, wherein the pivotability of the nut is limited by a peg (46) that is attached to the retaining device (20) and abuts a limit stop of a slot (48) in an outer contour of the nut (28') when pivoted to a maximum.

9. The clip nut (10) according to claim 1, wherein the nut (28, 28') comprises an insertion aid (54) that faces the first retaining device (14, 114) and extends in the axial direction.

10. The clip nut (10) according to claim 1, wherein the nut comprises a threaded insert or a taper nut.

11. The clip nut (10) according to claim 1, wherein the clip (12, 112) consists of at least a first and a second clip element (128, 130), the clip elements (128, 130) being interconnectable and separable.

12. The clip nut (10) according to claim 11, wherein the first clip element (128) consists of sheet metal and the second clip element (130) consists of plastics material.

13. The clip nut (10) according to claim 11, wherein the first clip element (128) comprises the first retaining device (114) and the second clip element (130) comprises the second retaining device (116, 118).

14. The clip nut (10) according to claim 11, wherein the first clip element (128) comprises two elastically deformable snap-in noses (132, 134) and the second clip element (130) comprises two openings (136, 138) for receiving the snap-in noses (132, 134).

15. The clip nut (10) according to claim 14, wherein the second clip element (130) comprises two recesses (140, 142) as insertion aids for the snap-in noses (132, 134).

16. A clip fastener comprising: a clip (12, 112) which comprises a first retaining device (14, 114), a second retaining device (16, 18, 20, 22, 24, 116, 118) and a connection device (26, 126) which connects the first retaining device (14, 114) to the second retaining device (16, 18, 20, 22, 24, 116, 118), a distance between the retaining devices (14, 16, 18, 20, 22, 24, 114, 116, 118) being variable, an extension of the first retaining device (14, 114) and of the second retaining device (16, 18, 20, 22, 24, 116, 118) substantially defining an x-axis and an extension of the connection device (26, 126) substantially defining a z-axis, and a y-axis being perpendicular to the x-axis and the z-axis, and a fastener comprising a component of a quarter-turn catch, a bayonet catch or a snap-in connection pivotally arranged on the second retaining device (16, 18, 20, 22, 24, 116, 118) such that an axis of the fastener (28, 28') is oriented in parallel with the z-axis or perpendicularly to the x-axis, or both, the axis of the fastener (28, 28') being pivotable out of a position parallel to the z-axis or a position perpendicular to the x-axis, or both, about the y-axis in an xz-plane, at least one of moving from the position parallel to the z-axis or moving from the position perpendicular to the x-axis;

a seal (30) facing the first retaining device (14, 114) is provided on the fastener (28), and a component (32) on which the clip nut (10) is fastened is in direct contact with the first retaining device (14, 114) and the seal (30).

17. A clip fastener comprising: a clip (12, 112) which comprises a first retaining device (14, 114), a second retaining device (16, 18, 20, 22, 24, 116, 118) and a connection device (26, 126) which connects the first retaining device (14, 114) to the second retaining device (16, 18, 20, 22, 24, 116, 118), a distance between the retaining devices (14, 16, 18, 20, 22, 24, 114, 116, 118) being variable, an extension of the first retaining device (14, 114) and of the second retaining device (16, 18, 20, 22, 24, 116, 118) substantially defining an x-axis and an extension of the connection device (26, 126) substantially defining a z-axis, and a y-axis being perpendicular to the x-axis and the z-axis, and a pin-receiving component having a hole for inserting a pin pivotally arranged on the second retaining device (16, 18, 20, 22, 24, 116, 118) such that an axis of the pin-receiving component is oriented in parallel with the z-axis or perpendicularly to the x-axis, or both, the axis of the pin-receiving component being pivotable out of a position parallel to the z-axis or a position perpendicular to the x-axis, or both, about the y-axis in an xz-plane, at least one of moving from the position parallel to the z-axis or moving from the position perpendicular to the x-axis;

a seal (30) facing the first retaining device (14, 114) is provided on the pin-receiving component, and a component (32) on which the clip nut (10) is fastened is in direct contact with the first retaining device (14, 114) and the seal (30).

\* \* \* \* \*